United States Patent [19]

Bennett, deceased et al.

[11] Patent Number: 4,671,029
[45] Date of Patent: Jun. 9, 1987

[54] DOCK SHELTER

[75] Inventors: David E. Bennett, deceased, late of Waukesha, Wis., by Barbara E. Bennett, personal representative; Mark A. Bennett, Milwaukee, Wis.

[73] Assignee: Kelley Company, Inc., Milwaukee, Wis.

[21] Appl. No.: 791,985

[22] Filed: Oct. 28, 1985

[51] Int. Cl.⁴ .............................................. E04H 14/00
[52] U.S. Cl. .................................................... 52/173 S
[58] Field of Search ........................ 52/173 DS, 2, 396

[56] References Cited

U.S. PATENT DOCUMENTS

| 3,303,615 | 2/1967 | O'Neal | 52/2 |
|---|---|---|---|
| 3,322,132 | 5/1967 | Rieder et al. | 52/173 DS |
| 3,391,502 | 7/1968 | O'Neal | 52/2 |
| 3,391,503 | 7/1968 | O'Neal | 52/2 |
| 3,994,103 | 11/1976 | Ouellet | 52/2 |
| 4,044,510 | 8/1977 | O'Neal | 52/2 |
| 4,238,910 | 12/1980 | O'Neal | 52/2 |
| 4,262,458 | 4/1981 | O'Neal | 52/2 |

FOREIGN PATENT DOCUMENTS

| 958946 | 12/1974 | Canada | 52/173 DS |
|---|---|---|---|
| 2930295 | 2/1981 | Fed. Rep. of Germany | 52/173 DS |

Primary Examiner—Carl D. Friedman
Assistant Examiner—Naoko N. Slack
Attorney, Agent, or Firm—Andrus, Sceales, Starke & Sawall

[57] ABSTRACT

An improved dock shelter comprising a pair of side panels and a top panel which are hinged to the dock and border a doorway in the dock. The panels are each biased to a storage position where the panel extends laterally outward from the dock. The panels are pivoted inwardly from the storage position to an operative sealing position by inflatable bags which are operably connected to the panels. A blower mounted above the doorway operates through a duct system to inflate the bags and pivot the panels into sealing engagement with the sides and top of a truck parked in front of the dock. When the loading operation is completed, operation of the blower is discontinued and the biasing mechanism acts to return the panels to the storage position. Corner panels are carried by the top panel and are mounted for flatwise sliding movement relative to the respective side panels. The corner panels provide an effective seal between the upper ends of the side panels and the top panel regardless of the angular inclination of the top panel.

19 Claims, 12 Drawing Figures

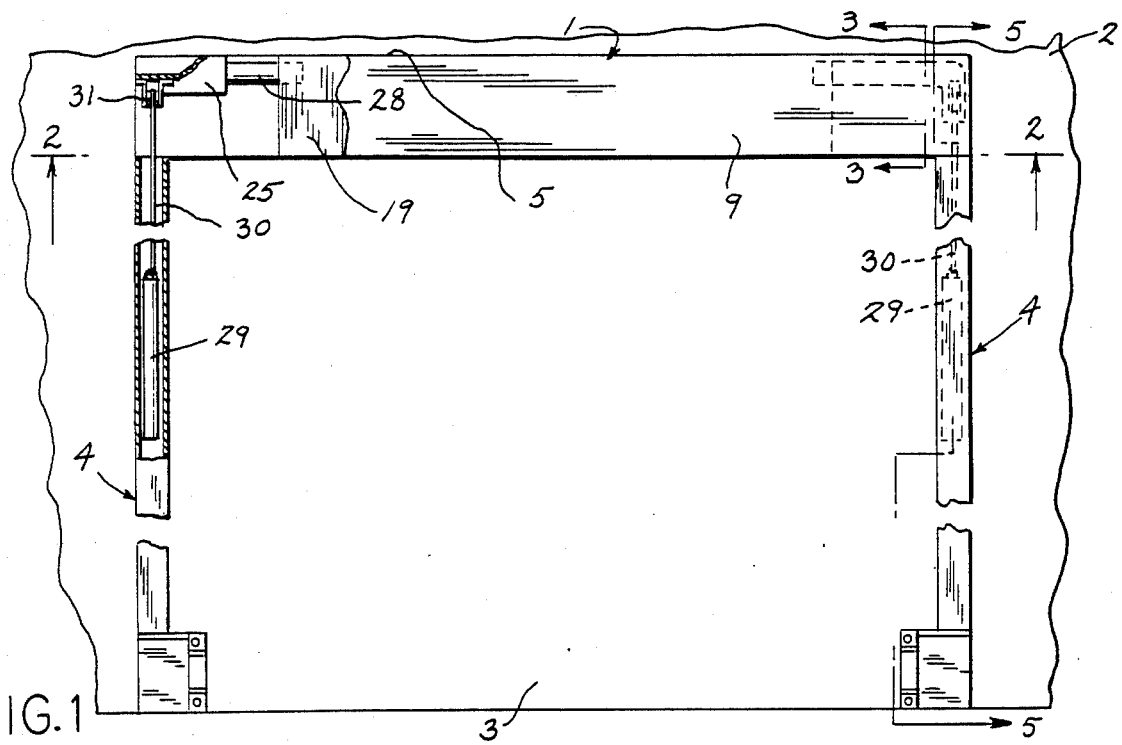
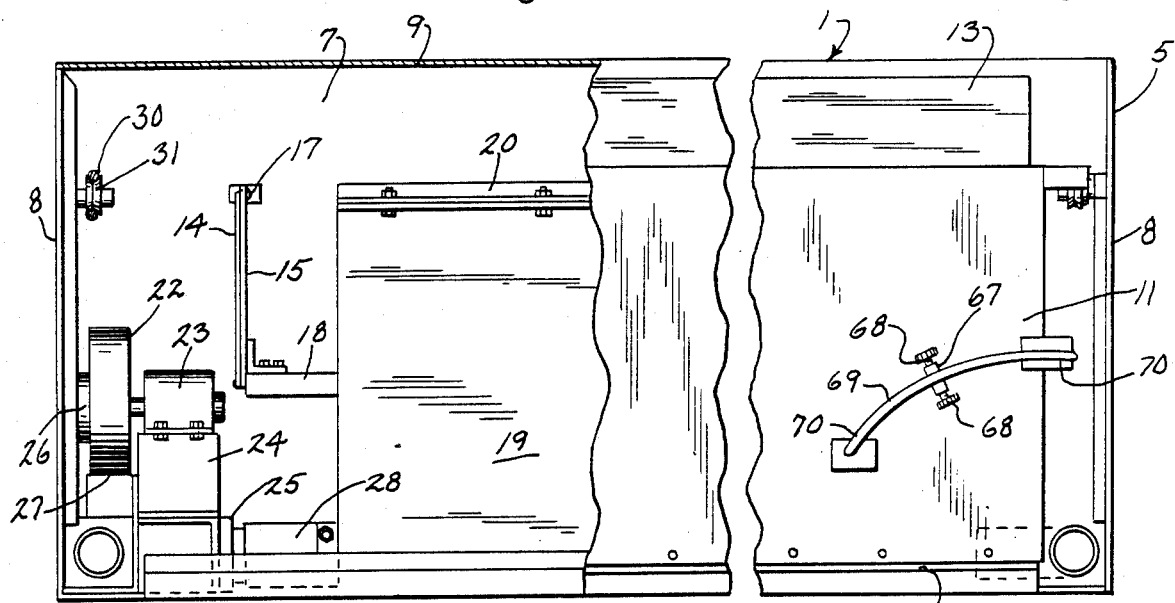
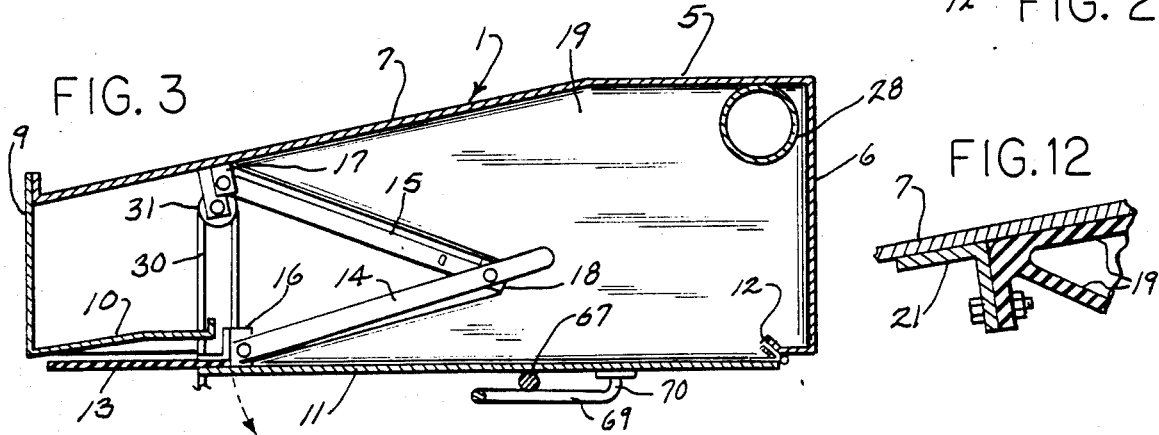
FIG.1
FIG.2
FIG.3
FIG.12

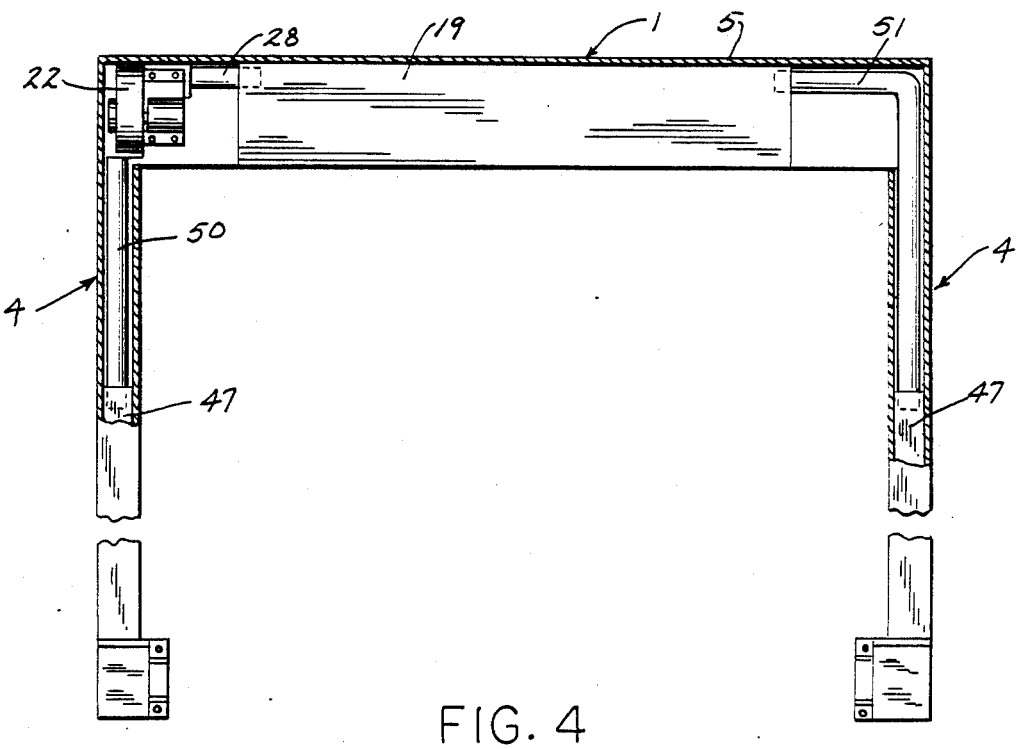
FIG. 4
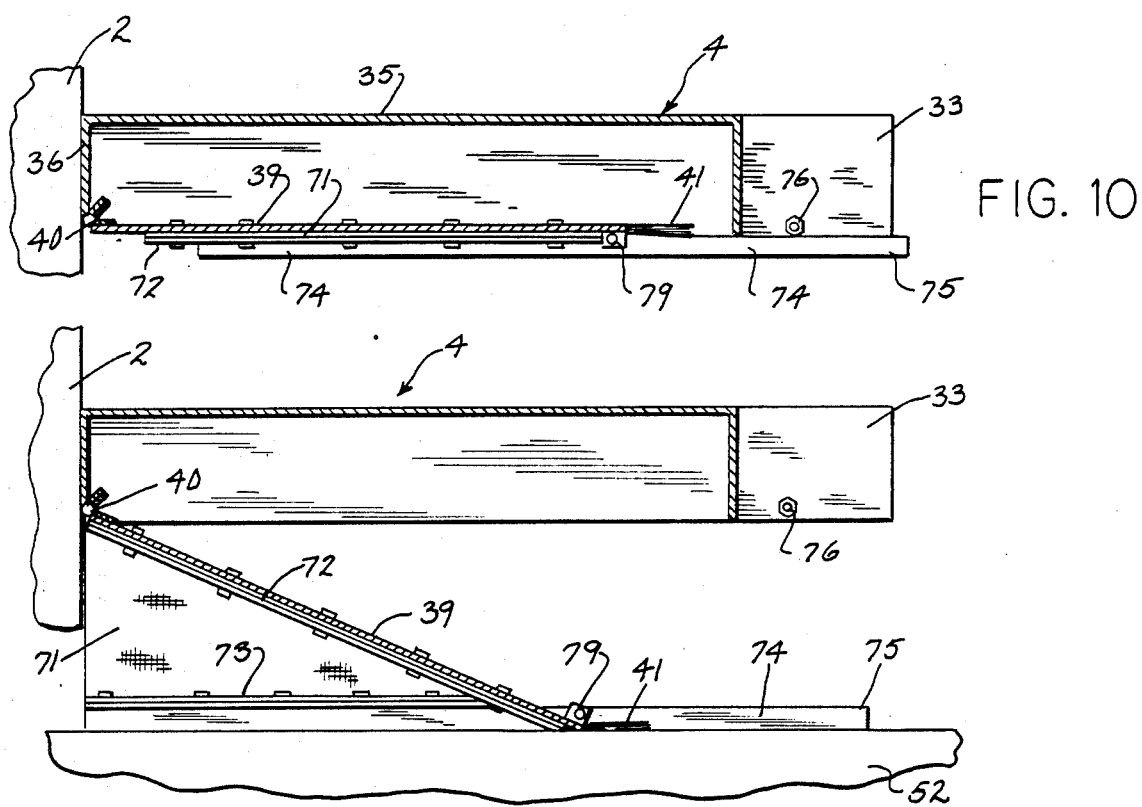
FIG. 10
FIG. 11

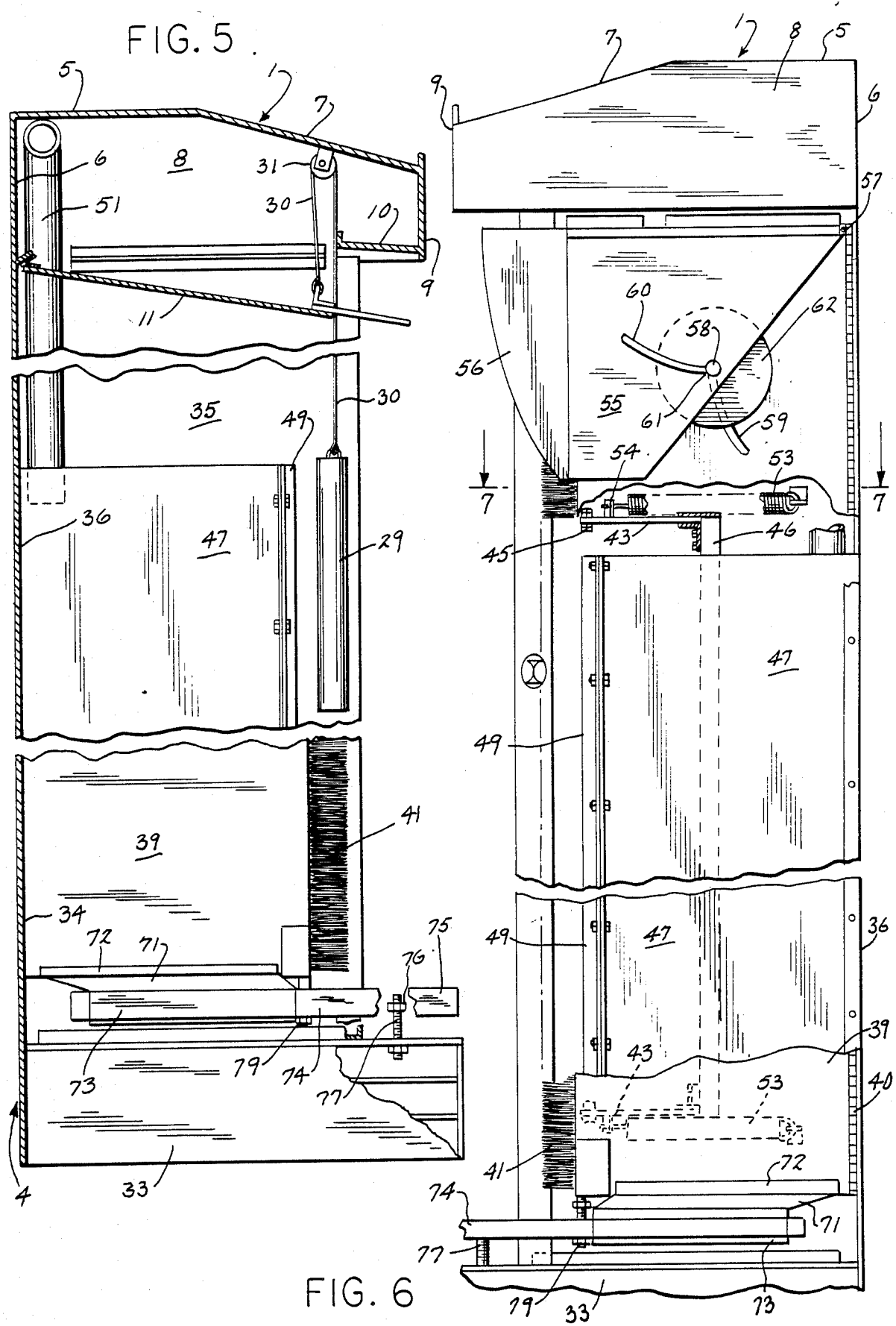

DOCK SHELTER

BACKGROUND OF THE INVENTION

Dock seals and dock shelters are used to provide a weather seal between a dockboard the rear end of a truck parked in front of the dock.

Dock seals are normally composed of a resilient material and are mounted along the sides and top of the doorway in the dock. As the truck backs toward the dock, the rear end of the truck will engage the dock seal to compress the seal and provide a weather seal between the truck and the dock.

In some cases, dock seals are composed of inflatable bags, while in other instances the dock seal may comprise resilient pads or cushions.

While the dock seal provides an effective weather seal between the truck and the dock, the dock seal, when in the sealing position, protrudes inwardly into the truck and encroaches upon the access opening. Because of this, the protruding edge of the dock seal is frequently engaged by cargo or fork lift trucks which can cause damage to the seal and substantially reduce the service life of the dock seal.

Dock shelters, instead of sealing against the rear end of the truck as in the case of a dock seal, are adapted to engage the sides and top of the truck. Certain dock shelters are composed of flexible panels which are positioned to be engaged by the truck, and due to their resilient nature, engage the sides and top of the truck. Other types of dock shelters are composed of movable panels which can be moved either by mechanical or fluid means from a storage position to a sealing position where the panels engage the outer truck surfaces.

By engaging the outer surface of the truck, dock shelters do not encroach or restrict the access opening to the interior of the truck, but dock shelters, in general, do not provide as complete a weather seal as dock seals, particulary at the upper corners where the side panels are joined to the top panel of the dock shelter. This is due primarily to the fact that the trucks have varying dimensions and both the top panel and side panels can be at different angles of inclination when in the sealing position.

Further, both seals and shelter are normally composed of fabric which is prone to wear from repeated engagement with the rear ends of trucks.

SUMMARY OF THE INVENTION

The invention is directed to a improved dock shelter which provides an improved weather seal and longer life. The dock shelter of the invention is composed of a housing or frame mounted on the outer surface of the dock and includes a pair of side sections, which are mounted along the sides of the doorway in the dock, and a top housing section which extends along the top of the doorway. A side panel is hinged to each side housing sections, while a top panel is hinged to the top housing section. The panels are biased to a storage position where the panels extend laterally outward from the dock.

The panels can be pivoted inwardly to engage the sides and top of the trucks respectively, by inflatable bags which are located between the respective panel and the corresponding housing section. A blower is mounted on the upper housing section above the doorway and operates through a duct system to inflate the bags and move the panels to the operative or sealing position.

When the loading operation is complete, operation of the blower is discontinued, and the biasing mechanism will return the panels to the storage position.

To provide an effective seal at the upper corners, at the junction between the side panels and the top panel, unique corner panels are incorporated in the dock shelter. The corner panels are carried by the top panel and are mounted for flatwise sliding movement relative to the respective side panels. The corner panels provide an effective seal against the truck regardless of the angular position of the top panel and side panels, which can vary depending on the dimensions of the truck.

The dock shelter of the invention also includes a provision for sealing the gap between the dock and the lower end of each side panel when the side panel is in the operative or sealing position. In this regard, an arm is pivotally connected to the outer end of each side panel and a flexible generally triangular sheet is connected between the arm and the side panel. When the side panel is in the storage position, the arm is positioned generally parallel to the side panel and the sheet is in a folded condition. As the side panel is moved inwardly to the sealing position, the outer end of the arm will initially engage the side of the truck to pivot the arm relative to the side panel and unfold the flexible sheet to enclose the gap between the side panel and the dock.

The dock shelter of the invention provides an effective weather seal to the truck. As the sealing panels engage the outer surfaces of the sides and top of the truck, there is no encroachment on the interior of the truck, so that the shelter will not interfere with the loading operation. Because the sealing panels are not contacted by the moving truck, but instead are brought into the sealing position after the truck has been moved into position at the loading dock, the shelter is less susceptible to damage and has a substantially longer service life than other dock seals and shelters.

As the inflatable bags are confined between the housing sections and the respective panels they are in a location where they will not be subjected to damage during use of the dock shelter.

The corner panels provide an effective seal at the upper corners of the dock shelter and automatically compensate for variations in the dimensions of the truck.

As the operating mechanism and bags are confined between the panels and the housing sections, the dock shelter has an improved esthetic appearance.

Other objects and advantages will appear in the course of the following description.

DESCRIPTION OF THE DRAWINGS

The drawings illustrate the best mode presently contemplated of carrying out the invention.

In the drawings:

FIG. 1 is a front elevational view of the dock shelter as mounted on a loading dock with parts broken away;

FIG. 2 is a section taken along line 2—2 of FIG. 1 with parts broken away;

FIG. 3 is section taken along line 3—3 of FIG. 1;

FIG. 4 is a front elevation of the dock shelter with parts broken away;

FIG. 5 is a section taken along line 5—5 of FIG. 1;

FIG. 6 is a fragmentary side elevational view of the outer surface of a side panel showing the corner panel;

FIG. 10 is a horizontal section showing the lower flexible seal in the storage position; and FIG. 11 is a view similar to FIG. 10 showing the lower seal in the unfolded sealing position; and FIG. 12 is an enlarged fragmentary section showing the attachment of the bag to the upper panel.

DESCRIPTION OF THE ILLUSTRATED EMBODIMENT

Figure 7:
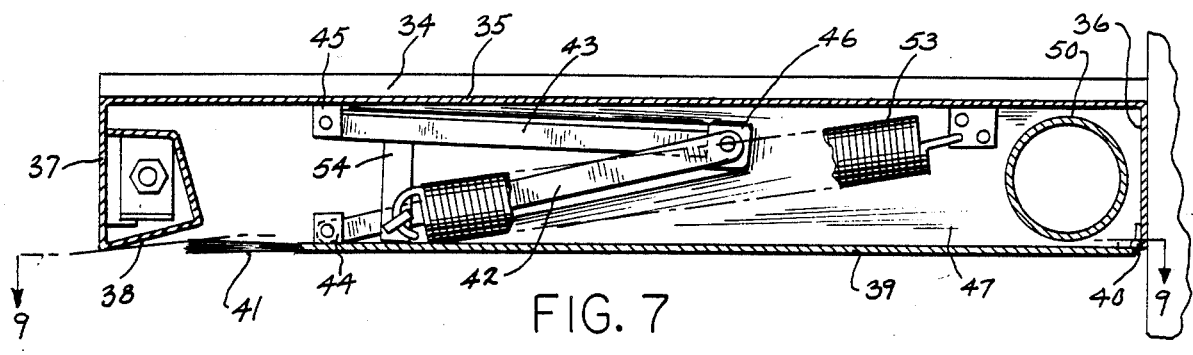
FIG. 7 is a section taken along line 7—7 of FIG. 6 and showing the side panel in the storage position.

The drawings illustrate a dock shelter to be mounted around a doorway in a loading dock to provide a weather seal between the dock and the rear end of a truck parked at the dock. In general, the shelter comprises an upper panel assembly 1 which is mounted on the dock or building 2 above doorway 3, and a pair of side panel assemblies 4 which are mounted along the sides of doorway 3.

Upper panel assembly 1, as best shown in FIGS. 2 and 3, includes a housing or frame 5 composed of an rear wall 6 attached to dock 2, an upper wall 7, a pair of side walls 8, and a front wall 9. As shown in FIG. 3, a flange 10 extends inwardly from the lower edge of front wall 9.

Upper panel assembly 1 also includes a movable upper panel 11 which can be pivoted downwardly into sealing engagement with the top surface of a truck parked at the loading dock. Upper panel 11 is pivotally connected to rear wall 6 of housing 5 through hinge 12 and the forward edge of upper panel 11 carries a flexible lip 13 which is adapted to engage the top of the truck.

As shown in FIGS. 2 and 3, upper panel 11 is connected to upper wall 7 of housing 5 by two pair of arms 14 and 15, only one pair of which is shown in FIG. 3. Each arm 14 is pivotally connected to bracket 16 on upper panel 11, while each arm 15 is connected to a bracket 17 on upper wall 6. As shown in FIG. 2, the adjacent ends of arms 14 and 15 are pivotally connected to a generally square column 18 which extends horizontally within housing 5.

In accordance with the invention, upper panel 11 can be moved between a generally horizontal storage position, as shown in FIG. 3, and a sealing or operating position through the inflation and deflation of a flexible bag 19 which is located within housing 5. A portion of bag 19 is connected to upper panel 11 through angle-shaped retaining strip 20, while a second portion of bag 19 is connected to upper wall 7 of housing 5 through retaining strip 21 which is connected to an angle on the inner surface of the upper wall 7, as shown in FIG. 12.

To inflate bag 19 and correspondingly pivot upper panel 11 downwardly, a blower 22 is mounted in housing 5. Blower 22 is driven by motor 23 which is mounted through bracket 24 to a plenum 25 attached to rear wall 6 of housing 5, as shown in FIG. 2. Air is drawn to blower 22 through an inlet 26 and is discharged from the blower through outlet 27. As shown in FIG. 2, outlet 27 is connected through plenum 25 to a conduit 28 which communicates with bag 19. Thus, operation of blower 22 will act to inflate bag 19 to move upper panel 11 from the generally horizontal storage position to a downwardly inclined position where lip 13 will engage the upper surface of the truck.

Upper panel 11 is biased to the horizontal or storage position by a pair of counterweights 29. Counterweights 29 are mounted for movement within the respective side panel assemblies 4, and each counterweight is connected through a cable 30 to an angle bracket on the inner surface of panel 11. Each cable 30 is trained over a pulley 31 mounted on the undersurface of upper wall 7. On termination of operation of blower 22, the counterweights serve as a biasing or counterbalancing mechanism to urge the upper panel 11 upwardly to a horizontal position and cause the air within bag 19 to be discharged back through the blower 22 to the atmosphere.

The two side panel assemblies 4 are similar in construction, so that the description will be limited to one of the side assemblies. As shown in FIG. 5, each side assembly 4 includes a base 33 that is attached to dock 2 and a housing or frame 34 extends upwardly from base 33. Housing 34 includes an inner wall 36 which is attached to dock 2, a side wall 35 that extends outwardly from inner wall 36, and an end wall 37. The inner edge of wall 37 is bent inwardly with a reverse bend to provide a hollow column as indicated by 38 in FIG. 7.

Figure 8:
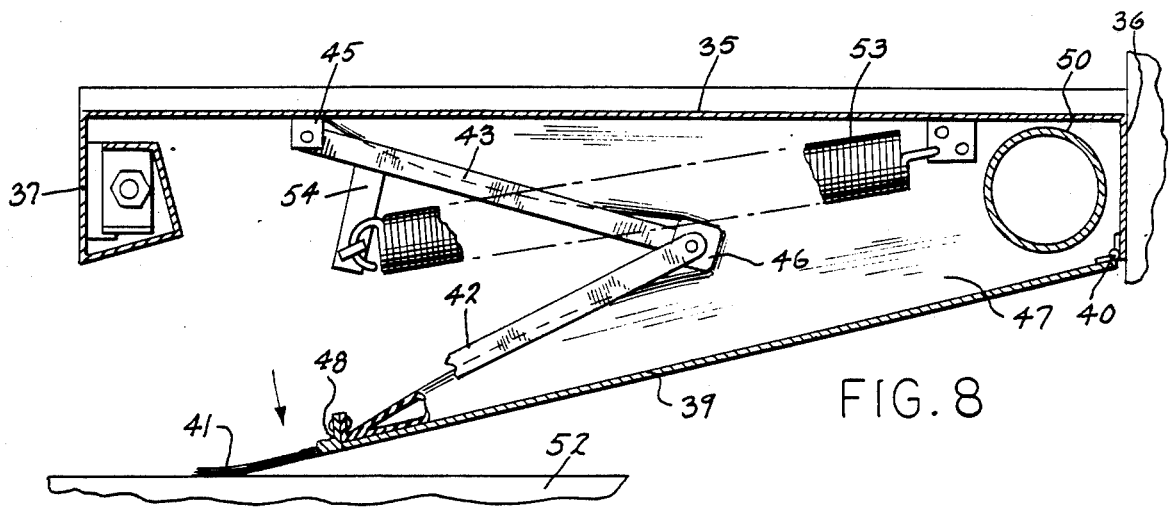
FIG. 8 is a view similar to FIG. 7 and showing the side panel in the extended sealing position.

The side panel assembly 4 also includes a movable side panel 39 which is connected by hinge 40 to inner wall 36. The free vertical edge of panel 39 carries a flexible brush 41 which is adapted to engage the side of a truck when panel 39 is moved inwardly to its sealing or operating position, as shown in FIG. 8.

Side panel 39 is connected to side wall 35 of housing 34 through two pair of arms 42 and 43. Each arm 42 is pivoted to a bracket 44 mounted on the inner surface of side panel 39, while each arm 43 is pivotally connected to a bracket 45 on the inner surface of wall 35. Corresponding ends of arms 42 are pivotally connected to a square column 46 which extends vertically within housing 34, while corresponding ends of arms 43 are rigidly connected to column 46.

An inflatable bag 47 is employed to move the side panel 39 from the storage position, where it is generally parallel to side wall 35 to the inward sealing position where brush 41 engages the side of a truck. As illustrated in FIGS. 7 and 8, bag 47 is sealed around duct 50, extends forwardly from panel 36 along panel 35, rearwardly along arm 43, around column 46, forwardly along arm 42 and then rearwardly along panel 39 to rear panel 36. As best shown in FIG. 8, one portion of bag 47 is connected to retaining strip 48 on the inner edge of panel 39, while a second portion of bag 47 is connected to retaining strip 49 on wall 35. Duct 50 connects the outlet 27 of blower 22 to the bag 47 of one of the side panel assemblies 4, while a duct 51 connects bag 19 with the bag 47 of the other of the side panel assemblies 4.

Operation of the panel assemblies 1 and 4 can be accomplished through manual activation, or alternately can be automatically tied into the unloading operation. In this latter situation, a sensing mechanism, such as a photoelectric eyes can be mounted in the column 38 of side housings 34 to sense the presence of a truck at the loading dock. When the overhead door, which normally encloses doorway 3, is opened and if the photoelectric eye senses the presence of a truck at the loading dock, blower 22 will be actuated to supply air to the bags 19 and 47, thereby causing the upper panel 11 and side panels 39 to move inwardly into sealing engagement with the top surface and side surfaces, respectively, of the truck 52. After the loading operation is completed and the overhead door is closed, operation of the blower 22 will be discontinued and springs 53 that are connected between wall 35 and lugs 54 on arms 43 will return the side panels 39 to their original storage position and counterweight 29 will return the top panel 11 to its original storage position causing the air within bags 19 and 41 to be displaced outwardly through blower 22 to the atmosphere.

As trucks can have varying heights and widths, the operating angle of both the top panel 11 and side panels 39 can vary consideraly. Because of this, there would normally be a gap between the upper edge of each side panel 39 and the lower surface of upper panel 11. To seal this gap, a pair of generally triangular panels 55 are carried by top panel 11 and are movable flatwise along the outer surface of the respective side panel 39. The outer edge of corner panel 55 carries a flexible lip 56, which is adapted to engage the side surface 54 of the truck.

Figure 9:
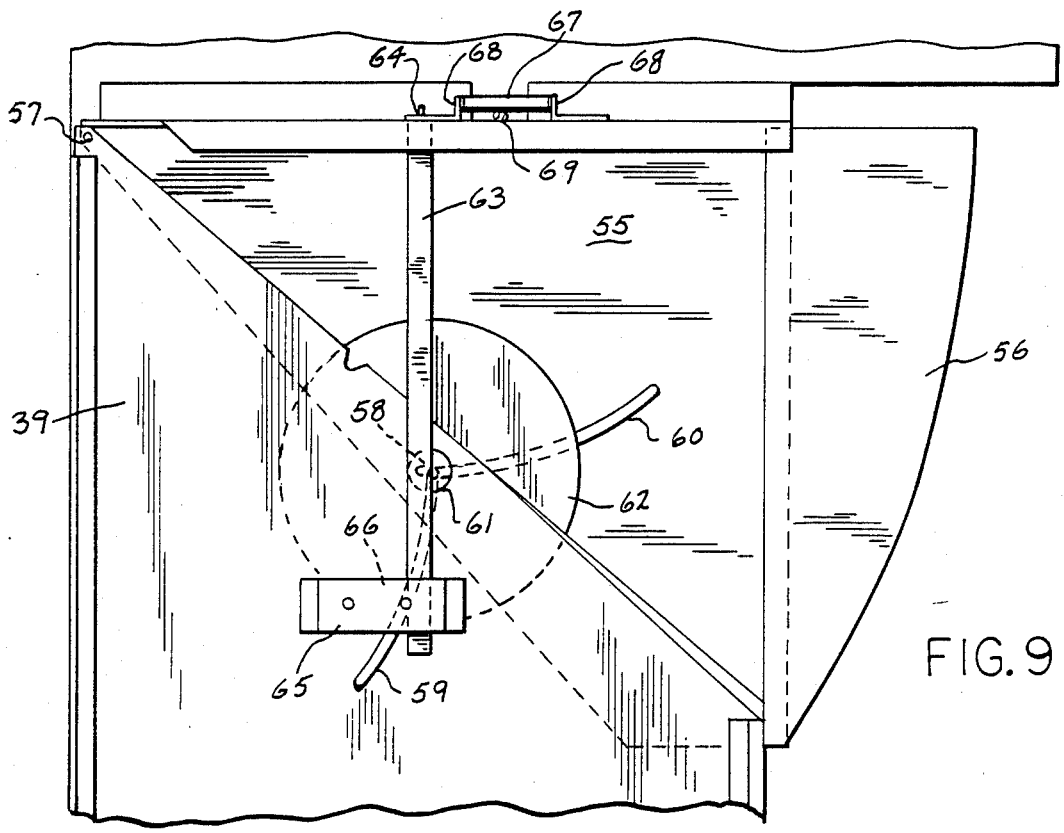
FIG. 9 is a fragmentary side elevation of the inside of the upper end of a side panel showing the attachment of the corner panel

As shown in FIGS. 6 and 9, the inner edge of panel 55 is pivotally connected to the respective side panel 39 at pivot 57 and a pin 58 extends through aligned slots 59 and 60 in panel 39 and panel 55, respectively. The outer end of pin 58 carries a keeper disc 61 and a plastic wear disc 62 is interposed between panels 39 and 55.

The inner end of pin 58 is secured to the side of a bar 63 which is located on the inside of panel 39, as shown in FIG. 9. The upper end of bar 63 is pivotally connected to panel 55 at pivot 64, while the lower end of bar 63 is free to move within a strap 65 mounted on the inner surface of panel 39. Suitable plastic wear strips 66 can be mounted on the inner surface of strap 65.

As previously mentioned panels 55 are carried by top panel 11. In this regard, an elongated roller (see FIGS. 2, 3, and 9) 67 is journaled between brackets 68 mounted on the upper edge of each panel 55 and a curved rod 69 mounted on the lower surface of panel 11 rides on roller 67. Rod 69 is provided with upwardly bent ends 70 which are secured to the lower surface of top panel 11, so that the central portion of rod 69 is spaced from panel 11.

With this construction, each panel 55 is carried by upper panel 11 and the rod 69 and roller 67 arrangement along with the dual slot arrangement 59,60 permits panel 55 to remain flatwise against the respective side panel 39, even though panels 11 and 39 may pivot relative to each other.

When side panel assemblies 4 are in their inner or sealing position with panels 39 in engagement with the sides of the truck 52, there is a generally triangular gap at the lower end of the side panel assembly 4 between the angular side panel 39 and the side of the truck. The invention also includes a provision for enclosing this gap, as the side panel is moved to its sealing position. In this regard, a flexible fabric panel 71 is connected through angle 72 to the lower edge of each side panel 39. Flexible panel 71 is also connected to the upper edge of a plate 73 that is secured to an elongated arm 74. As shown in FIGS. 6, 10 and 11, the outer portion of arm 74 is pivotally connected to side panel 39 at pivot 79 and the outer extremity of arm 74 projects outwardly beyond the brush 41 on panel 39.

When side panel 39 is in its storage position, arm 74 will be located generally parallel to the panel 39 as shown in FIG. 10, with the flexible fabric panel 71 being in a folded condition. When panel 39 is pivoted inwardly to its sealing position, the outer end 75 of arm 74 will intially engage the side of the truck, causing arm 74 to pivot relative to side panel 39, thereby unfolding the flexible panel 71 and enclosing the gap, as illustrated in FIG. 11.

When panel 39 is returned inwardly to its storage position, the outer end 75 of arm 74 will engage a roller 76 mounted through bracket 77 to base 33, and engagement of end 75 with roller 76 will pivot arm 74 back to its original position, generally parallel to panel 39, and causing flexible panel 75 to fold, as shown in FIG. 10.

Various modes of carrying out the invention are contemplated as being within the scope of the following claims particulary pointing out and distinctly claiming the subject matter which is regarded as the invention.

I claim:

1. A dock shelter for providing a weather seal for a doorway in a loading dock, comprising a pair of side panels disposed along the sides of the doorway and pivotally connected to the dock, a top panel disposed along the upper end of the doorway and pivotally connected to the dock, said panels being pivotable from a storage position where the panels extend outwardly from said dock to a sealing position where said side panels and top panel engage the sides and top surfaces respectively of a truck parked in front of the loading dock, biasing means for biasing the panels to the storage position, an inflatable bag operably connected to each panel, and inflating means for inflating each bag to thereby move the panels from the storage position to the sealing position.

2. The dock shelter of claim 1, and including a housing mounted on the dock and bordering the doorway, said housing including a pair of side sections extending outwardly from the dock and a top section located above the top of the doorway and extending outwardly from said dock, said panels being pivotally connected to the corresponding housing sections, each bag being disposed between the respective panel and the corresponding housing section.

3. The dock shelter of claim 1, and including a top bag and a pair of side bags, said inflating means comprising a blower disposed above the doorway, and a duct system interconnecting the blower and said bags.

4. The dock shelter of claim 3, wherein said duct system includes, a first duct connected to one of said side bags, a second duct interconnecting the blower with the top bag, and a third duct interconnecting the top bag to the other side bag.

5. The dock shelter of claim 2, and including a pair of arms pivotally connecting each panel to the respective housing section.

6. The dock shelter of claim 5, wherein said biasing means interconnects one of said arms with the respective housing section.

7. The dock shelter of claim 1, and including a flexible sealing member connected to the outer edge of each panel and adapted to engage the respective surface of the truck.

8. The dock shelter of claim 7, wherein said sealing member comprises a brush.

9. The dock shelter of claim 1, and including a corner panel mounted flatwise for sliding movement relative to the upper end of each side panel, and means for supporting each corner panel from the top panel.

10. A dock shelter for providing a weather seal around a doorway in a loading dock, comprising a housing mounted on the outer surface of the dock and bordering the doorway, said housing including a pair of side sections disposed adjacent the sides of the doorway and a top section disposed adjacent the top of the doorway, a pair of side panels pivotally connected to the respective side sections of the housing, a top panel pivotally connected to the top section of the housing, said panels being pivotable from a storage position wherein the panels extend outwardly from the dock to an operating position where the outer ends of the panels engage the sides and top surfaces of a truck, respectively, biasing means interconnecting the housing sections with the corresponding panels to bias the panels to the storage position, a side bag disposed between each side section of the housing and the respective side panel, a top bag disposed between the top housing section and the top panel, and inflating means operably connected to each bag for inflating the bags and pivoting the panels from the storage position to the operating position.

11. The dock shelter of claim 10, and including a flexible sealing member connected to the outer edge of each panel and adapted to engage the respective surface of the truck.

12. The dock shelter of claim 10, and including a corner panel pivotally connected to the upper end of each side panel and mounted flatwise for pivotal movement with respect to the respective side panel, and support means for supporting each corner panel from the respective side portion of the top panel.

13. The dock shelter of claim 12, wherein said support means comprises a movable connection between each corner panel and the top panel, with said movable connection constructed and arranged to permit the corner panel to remain flatwise with respect to the side panel during variations in angular inclination of the top panel.

14. The dock shelter of claim 10, and including sealing means operably connected to the lower end portion of each side panel to enclose the gap between the lower end portion of the side panel and the dock when the side panel is in the operating position.

15. The dock shelter of claim 14, wherein said sealing means comprises an arm pivotally connected to the end of each side panel and having an extremity projecting beyond the said end of the side panel, a flexible sheet connecting the lower end of the side panel to the arm, said arm being movable between an inoperative position, where the arm is disposed generally parallel to the side panel when the side panel is in the storage position and a sealing position where the arm is disposed at an acute angle to the side panel and the sheet is in a generally unfolded condition, inflation of each side bag causing the extremity of the arm to engage the side surface of the truck to pivot said arm from the inoperative position to the sealing position.

16. The dock shelter of claim 15, and including means operable as a consequence of the side panel moving from the operating position to the storage position for moving the arm from the sealing position to the inoperative position.

17. A dock shelter for providing a weather seal around a doorway in a loading dock, comprising a top panel pivotally connected to the dock and disposed above the doorway, a side panel pivotally connected to the dock and disposed along the side of the doorway, said panels being pivotable from a storage position where the panels extend outwardly from the dock to an operating position where the panel engage the top and side surface respectively of a truck parked in front of the loading dock, and a corner panel movably mounted flatwise with respect to the upper end portion of each side panel and having an upper edge, and means responsive to a variation in the angular inclination of the top panel for pivoting the corner panel with respect to the side panel to maintain said upper edge in sealing engagement with said top panel.

18. A dock shelter for providing a weather seal for a doorway in a loading dock, comprising a panel disposed along an edge of the doorway and pivotally connected to the dock, said panel being movable from a storage position to a sealing position where said panel is disposed to engage the outer surface of the truck parked in front of the loading dock, biasing means for biasing the panel to the storage position, an inflatable bag operably connected to said panel, and inflating means for inflating said bag to thereby move the panel from the storage position to the sealing position.

19. A dock shelter for providing a weather seal around a doorway in a loading dock, comprising a housing mounted on the outer surface of the dock and extending along the side of the doorway, a side panel pivotally connected to the housing and movable from a storage position where the panel extends outwardly from the dock to an operating position where the panel is disposed to engage the outer side surface of a truck parked in front of the loading dock, and sealing means operably connected to the lower end of the side panel to seal the generally triangular gap defined by the lower end of the side panel and the dock and the outer surface of said truck when the side panel is in the operating position, said sealing means comprises an arm pivotally connected to the outer end of the side panel and having an extremity projecting beyond the outer end of the side panel, a flexible sheet connected between the lower end of the side panel and said arm, said arm being movable between a non-sealing position where the arm is generally parallel to the side panel when the side panel is in the storage position and said sheet is in a folded condition, to a sealing position when the side panel is in the operating position and said arm is disposed at an acute angle with respect to said side panel and said sheet is in an unfolded condition, and means responsive movement to movement of said side panel from the storage position to the operating position for moving the arm from the non-sealing position to the sealing position.

* * * * *

UNITED STATES PATENT AND TRADEMARK OFFICE
CERTIFICATE OF CORRECTION

PATENT NO. : 4,671,029
DATED : June 9, 1987
INVENTOR(S) : DAVID E. BENNETT (deceased) and MARK A. BENNETT It is certified that error appears in the above-identified patent and that said Letters Patent is hereby corrected as shown below:

Col. 8, CLAIM 17, Line 4, Cancel "loacing" and substitute therefor ---loading---

Signed and Sealed this

Twenty-ninth Day of November, 1988

Attest:

DONALD J. QUIGG

Attesting Officer   Commissioner of Patents and Trademarks